United States Patent
Aluvala et al.

(10) Patent No.: US 11,272,043 B2
(45) Date of Patent: Mar. 8, 2022

(54) PACKET HANDLING BASED ON USER INFORMATION INCLUDED IN PACKET HEADERS BY A NETWORK GATEWAY

(71) Applicant: VMWARE, INC., Palo Alto, CA (US)

(72) Inventors: Suman Aluvala, Bengaluru (IN); Craig Farley Newell, Atlanta, GA (US); Amit Kumar Yadav, Atlanta, GA (US); Pavan Rajkumar Rangain, Bengaluru (IN); Rohit Pradeep Shetty, Bengaluru (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/815,037

(22) Filed: Mar. 11, 2020

(65) Prior Publication Data
US 2021/0227056 A1    Jul. 22, 2021

(30) Foreign Application Priority Data
Jan. 22, 2020 (IN) .............................. 202041002785

(51) Int. Cl.
| H04L 29/06 | (2006.01) |
| H04L 69/22 | (2022.01) |
| H04L 69/16 | (2022.01) |
| H04L 69/326 | (2022.01) |
| H04L 12/46 | (2006.01) |
| H04W 88/18 | (2009.01) |

(52) U.S. Cl.
CPC .......... *H04L 69/22* (2013.01); *H04L 12/4633* (2013.01); *H04L 12/4641* (2013.01); *H04L 63/0272* (2013.01); *H04L 69/16* (2013.01); *H04L 69/326* (2013.01); *H04W 88/18* (2013.01)

(58) Field of Classification Search
None
See application file for complete search history.

(56) References Cited

U.S. PATENT DOCUMENTS

| 10,033,693 | B2 | 7/2018 | Sengupta et al. | |
| 2016/0094669 | A1* | 3/2016 | Karampurwala | H04L 69/22 370/328 |
| 2016/0344635 | A1* | 11/2016 | Lee | H04L 47/20 |
| 2017/0222977 | A1 | 8/2017 | Newell et al. | |
| 2017/0230334 | A1* | 8/2017 | Newell | H04W 12/03 |
| 2020/0014638 | A1 | 1/2020 | Chen et al. | |
| 2020/0014663 | A1 | 1/2020 | Chen et al. | |

\* cited by examiner

*Primary Examiner* — Christine T Duong

(57) ABSTRACT

The technology disclosed herein enables packet handling based on user information included in packet headers. In a particular embodiment, a method provides, in a gateway to a network environment, establishing a first connection with a first connection endpoint outside of the network environment. The method further provides identifying first user information associated with the first connection and adding the first user information to a packet header of one or more first packets associated with the first connection. Also, the method provides transferring the one or more first packets into the network environment.

16 Claims, 7 Drawing Sheets

PACKET HANDLING BASED ON USER INFORMATION INCLUDED IN PACKET HEADERS BY A NETWORK GATEWAY

RELATED APPLICATIONS

Benefit is claimed under 35 U.S.C. 119(a)-(d) to Foreign Application Serial No. 202041002785 filed in India entitled "PACKET HANDLING BASED ON USER INFORMATION INCLUDED IN PACKET HEADERS BY A NETWORK GATEWAY" on Jan. 22, 2020, by VMWARE, Inc., which is herein incorporated in its entirety by reference for all purposes.

TECHNICAL BACKGROUND

In many types of network arrangements, a gateway facilitates network traffic from one side of the gateway to the other. For example, a gateway may be configured to facilitate network traffic entering and exiting a network environment. A connection may be established between the gateway and an external endpoint that is outside of the network environment. When establishing that connection, the gateway may obtain user information associated with the external endpoint. The gateway may use the user information to determine, for instance, which services or endpoints within the network environment the external endpoint is allowed to access. If communications from the external endpoint are allowed to enter the network environment, then the gateway creates a connection to another system within the network environment over which the communications will be passed from the gateway. Once passed from the gateway into the network environment, the user information associated with the communications will be unavailable for use by networking elements (e.g., interface cards, firewalls, routers, etc.) within the network environment unless the gateway is somehow able to pass along the user information.

SUMMARY

The technology disclosed herein enables packet handling based on user information included in packet headers. In a particular embodiment, a method provides, in a gateway to a network environment, establishing a first connection with a first connection endpoint outside of the network environment. The method further provides identifying first user information associated with the first connection and adding the first user information to a packet header of one or more first packets associated with the first connection. Also, the method provides transferring the one or more first packets into the network environment.

In some embodiments, the one or more first packets comply with Internet Protocol version 4 and adding the first user information to the packet header comprises including the first user information to an option type field of the packet header. In some embodiments, the one or more first packets comply with Internet Protocol version 6 and adding the first user information to the packet header comprises including the first user information to an extension header of the packet header.

In some embodiments, the method includes establishing a second connection within the network environment using a transport protocol. In those embodiments, the one or more first packets may comprise handshake packets exchanged during a handshake procedure for the transport protocol.

In some embodiments, the one or more first packets comprise packets received via the first connection.

In some embodiments, the first connection comprises a virtual private network (VPN) connection between the gateway and identifying the first user information comprises extracting the first user information from encapsulation for the VPN connection. In some embodiments, identifying the first user information comprises obtaining the first user information during establishment of the VPN connection.

In some embodiments, the method provides implementing microsegmentation within the network environment based on the first user information in the packet header. Implementing the microsegmentation may comprise enforcing policies at one or more packet network interfaces within the network environment.

In another embodiment, an apparatus is provided having one or more computer readable storage media and a processing system operatively coupled with the one or more computer readable storage media. Program instructions stored on the one or more computer readable storage media that, when read and executed by the processing system, direct the processing system to establish a first connection with a first connection endpoint outside of the network environment. The program instructions further direct the processing system to identify first user information associated with the first connection and add the first user information to a packet header of one or more first packets associated with the first connection. Also, the program instructions direct the processing system to transfer the one or more first packets into the network environment.

DETAILED DESCRIPTION

The network gateways described herein pass user information into the network environments for which the gateways are handling ingress and egress network traffic. Passing the user information into the network environments allows components within the network environments to consider the user information when determining how to handle the network traffic. In the examples below, the user information is added to the headers of packets associated with the network traffic (e.g., packets that comprise the network traffic or packets used to establish a connection within a network environment for the network traffic). Adding user information to a packet header allows network components (e.g., network interfaces, routers, firewalls, etc.) to easily access the user information at a transport layer of the network traffic. That is, a network component needs merely read the packet header, as the network component typically would do anyway for other types of information (e.g., network addresses, packet size information, etc.), to retrieve the user information. The network component can then handle the packet based on policies/rules that apply to the user information.

For example, a policy may indicate that only certain types of users are able to access a particular system within a network environment. User information included in a header for a packet directed to that particular system allows a component enforcing that policy to easily determine whether the packet should be allowed to reach the system. The component simply reads the user information from the header and determines whether the user information indicates that the associated user is able to access the system. Advantageously, the policy is enforced by the component without having to determine the user information through other means, such as by inspecting the payload of a packet (if possible) or otherwise receiving the user information through a separate channel outside the normal course of directing network traffic associated with the user information into the network environment.

Figure 1:
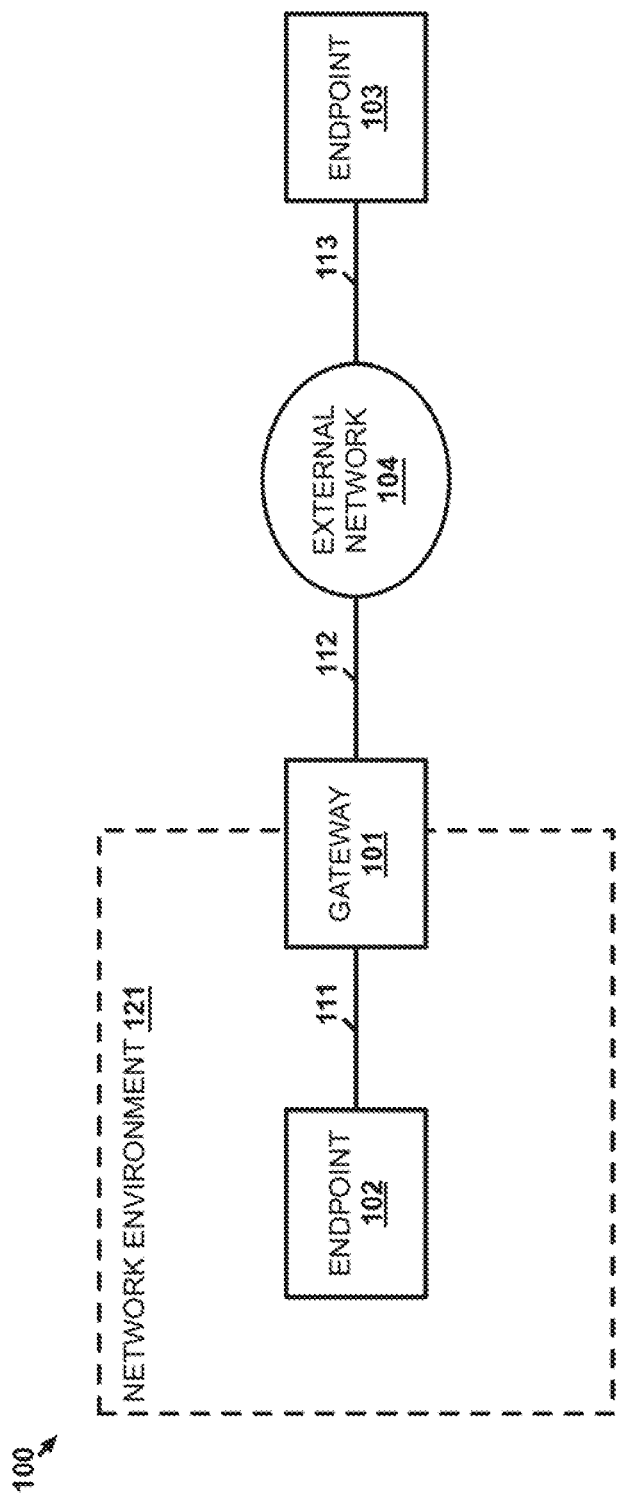
FIG. 1 illustrates an implementation for handling network traffic based on user information in packet headers.

FIG. 1 illustrates implementation 100 for handling network traffic based on user information in packet headers. Implementation 100 includes gateway 101, endpoint 102, endpoint 103, and external network 104. Gateway 101 and endpoint 102 communicate over communication link 111. Gateway 101 and external network 104 communicate over communication link 112. Communication links 111-113 may be direct links or may include intervening systems or devices. Gateway 101 and endpoint 102 are networked systems that are part of network environment 121. Network environment 121 may include any number of other networked computing systems and/or devices. External network 104 comprises networking systems and devices outside of network environment 121 over which external systems, such as endpoint 103 communicate with network environment 121.

In operation, gateway 101 is a network gateway that facilitates network traffic into and out of network environment 121. For network traffic to enter network environment 121, an external connection to gateway 101 from external network 104 (e.g., a connection with endpoint 103) terminates at gateway 101. User information used by gateway 101 during establishment of the connection is added by gateway 101 to the headers of packets used to transfer the network traffic within network environment 121 (e.g., packets used to establish a connection with gateway 101 internal to network environment 121 and/or packets that carry the network traffic within network environment 121). Components capable of reading packet headers within network environment 121 can then be configured to read that user information for whatever reason an administrator of network environment 121 sees fit (e.g., for packet routing determinations).

Figure 2:
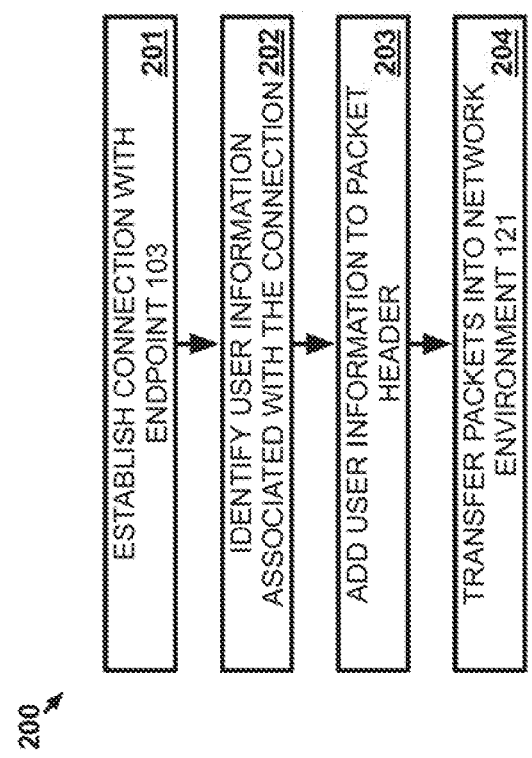
FIG. 2 illustrates an operation for handling network traffic based on user information in packet headers.

FIG. 2 illustrates operation 200 for handling network traffic based on user information in packet headers. In operation 200, gateway 101 establishes a connection with endpoint 103, which is outside of network environment 121 (201). The connection may be in any network transport protocol, although secure transport protocols are preferable to help ensure the integrity of the user information discussed below. For example, the connection between gateway 101 and endpoint 103 may use a secure encapsulation protocol that creates a virtual private network (VPN) connection.

From the establishment of the connection with endpoint 103, gateway 101 identifies user information associated with the connection (202). The user information may include any information associated with a user, such as a username, a real-world name, location, demographics, or any other information that may be relevant to enforcing policies within network environment 121. The user information may be explicitly provided by endpoint 103 in conjunction with the establishment of the connection, may be obtained by gateway 101 from information explicitly provided by endpoint 103, and/or may be requested by gateway 101 in conjunction with the connection. For example, the user information may be a username (or other credentials) provided by endpoint 103 during establishment of the connection or gateway 101 may reference a database of usernames to determine the real-world name of a user associated with the username.

Gateway 101 then adds the identified user information to a packet header of one or more packets associated with the connection (203). The packets may be exchanged in any packet-based protocol that uses packet headers into which gateway 101 can include the user information discussed above. Gateway 101 complies with the procedure, defined by whichever packet-based protocol is being used, for including additional information in a packet header (e.g., the user information) beyond the information required by the packet-based protocol (e.g., source/destination addresses, protocol version information, fragment offset information, etc.). In some cases, the protocol may indicate that gateway 101 needs to modify the information in one or more of the required fields in order to include the user information elsewhere in the packet header. For example, a required field for a protocol's packet header may indicate a number of additional fields being included in the packet header beyond the protocol's required fields. Gateway 101 may modify that required field to indicate that at least one additional field is being included in the packet header (i.e., a field for the user information). Another network element reading the packet header would therefore be notified that the additional field(s) exist so that the included user information from gateway 101 can be read properly (or ignored without adversely affecting packet handling in cases where that other network element is not configured to use the user information). Two common packet exchange protocols are Internet Protocol (IP) version 4 (IPv4) and IP version 6 (IPv6). Both IP versions include provisions to include additional information beyond that required by the protocol to be inserted into their respective headers, as discussed in more detail below.

After adding the user information, gateway 101 transfers the one or more packets into network environment 121 (204). In this example, the packets are directed to endpoint 102. Endpoint 102 is a system with which gateway 101 establishes, or attempts to establish, a communication session internal to network environment 121. In some examples, packet handlers within network environment 121, such as a firewall, router, load balancer, quality of service enforcer, etc., on communication link 111 may read the user information from the packet headers and prevent the packets from reaching gateway 101 based on a policy of network environment 121 (e.g., a policy that allows certain users or types of users to access endpoint 102). In those cases, a connection between gateway 101 and endpoint 102 may be blocked from being established or communications exchanged on the connection after establishment may be blocked. In other examples, a network interface of endpoint 102 itself may read the user information and enforce a policy based on the user information. Regardless of which element(s) within network environment 121 enforce a network policy, those elements do not require capabilities (e.g., payload inspection) to obtain the user information beyond reading the user information from the packet headers as any other header information may be read by the element(s).

Operation 200, therefore, allows user information obtained by gateway 101 to be used within network environment 121 rather than being limited for use only by gateway 101. The user information is relevant with respect to a first connection between gateway 101 and endpoint 103 (via user information exchanged in association with the establishment of that first connection) and a second connection (or attempted connection) between gateway 101 and endpoint 102 (via the user information being added to the packet headers within network environment 121). Should both connections be established, endpoint 103 and endpoint 102 exchange communications through gateway 101 on the two connections.

Figure 3:
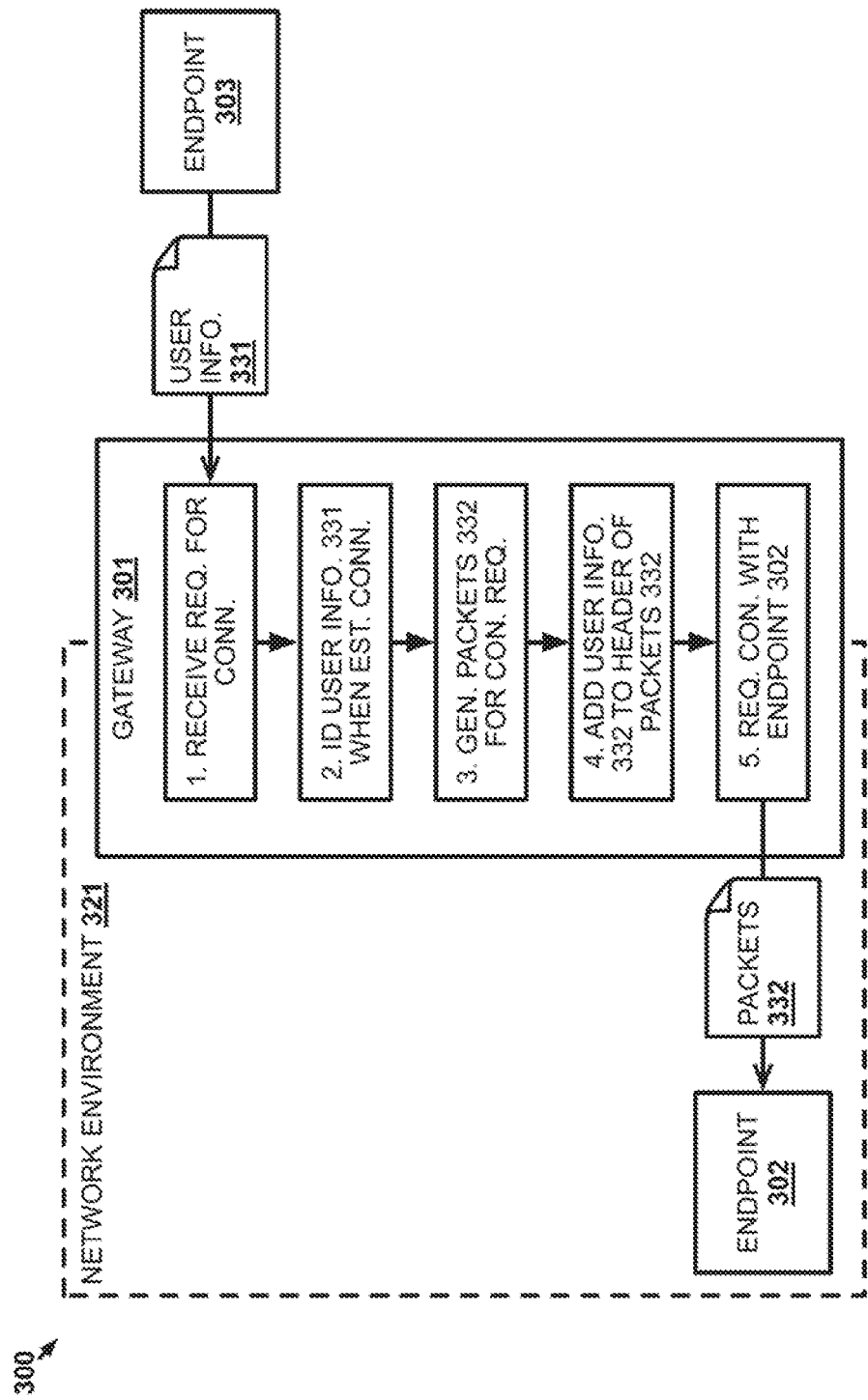
FIG. 3 illustrates an operational scenario for handling network traffic based on user information in packet headers.

FIG. 3 illustrates operational scenario 300 for handling network traffic based on user information in packet headers. Operational scenario 300 includes gateway 301, endpoint 302, and endpoint 303. Gateway 301 is an example of gateway 101, endpoint 302 is an example of endpoint 102, endpoint 303 is an example of endpoint 103, and network environment 321 is an example of network environment 121. Gateway 301 receives a request at step 1 to establish a connection with endpoint 303 over an external network (e.g., external network 104). Either in that initial request, or at some other point during negotiation for the requested connection, user information 331 is identified by gateway 301 at step 2. As illustrated by operational scenario 300, endpoint 303 provides user information 331 to gateway 301, although other examples may have at least a portion of user information 331 provided from elsewhere (e.g., a user information repository). In one example, user information 331 may include user credentials (e.g., username, password, security token, etc.) that are supplied by endpoint 303 to gateway 301. Gateway 301 uses the credentials to determine whether endpoint 303 is authorized to establish the requested connection. For instance, gateway 301 may use the credentials to determine whether endpoint 303 subscribes to a service provided by systems in the network environment (e.g., network environment 121) accessible through gateway 301.

After the requested connection is established between gateway 301 and endpoint 303, gateway 301 attempts to establish a connection with endpoint 302 within the. In particular, gateway 301 generates one or more packets 332 at step 3 that carry a request for a connection with endpoint 302. For example, the packets may be part of a transmission control protocol (TCP) three-way handshake to establish a TCP connection between gateway 301 and endpoint 302. When generating, or after generating, packets 332, gateway 301 adds user information 331 to the header of each respective packet of packets 332. After adding user information 331 to the header(s), gateway 301 requests a connection with endpoint 302 at step 5 by transferring packets 332 towards endpoint 302. In some examples, a network interface at endpoint 302 may read user information 331 from the headers of packets 332 and determine whether the connection with gateway 301 should be allowed based on user information 331. For example, a policy for network environment 321 may indicate which users are allowed to access applications provided by endpoint 302 and endpoint 302 may enforce that policy by reading user information 331 from packets 332. If the connection is not allowed, then endpoint 302 may simply drop packets 332 or may notify gateway 301 that the requested connection is denied. In alternative examples, a network component between endpoint 302 and gateway 301 may read user information 331 from packets 332 and determine how packets 332 should be handled based on policies of network environment 321. For instance, packets 332 may be dropped, allowed to proceed, or redirected depending on the policies applied to user information 331 read from packets 332. Had gateway 301 not passed user information 331 into network environment 321 within the headers of packets 332, elements of network environment 321, such as endpoint 302, would not have been able to enforce policies on packets 332 that apply to user information 331.

Figure 4:
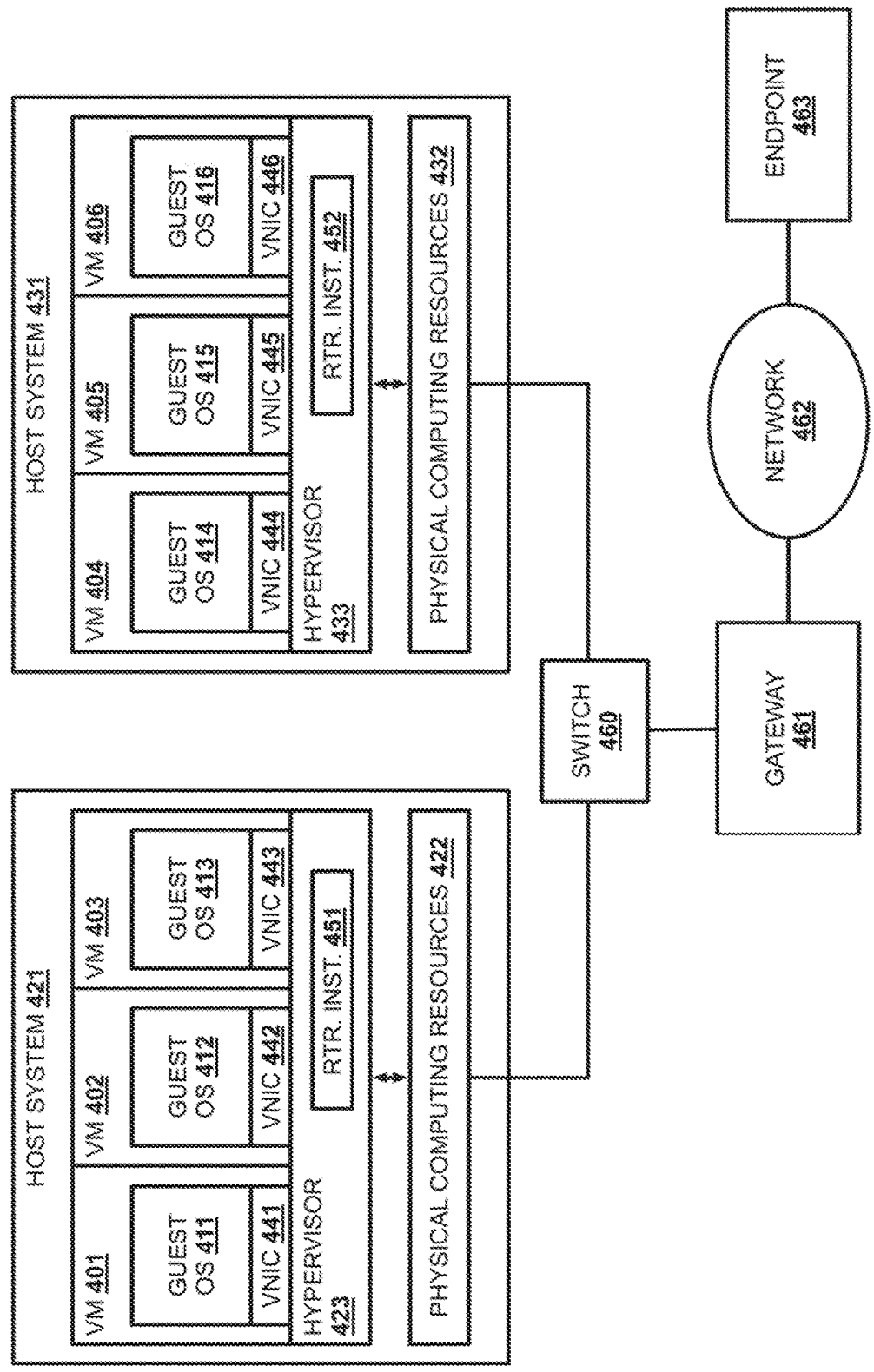
FIG. 4 illustrates another implementation for handling network traffic based on user information in packet headers.

FIG. 4 illustrates implementation 400 for handling network traffic based on user information in packet headers. Implementation 400 includes host computing systems 421 and 431, network switch 460, gateway 461, external network 462, and endpoint 463. External network 462 is considered to be on the external side of gateway 461 and may comprise one or more local area networks (LANs) and/or wide area networks (WANs), such as the Internet. In this example, endpoint 463 comprises a personal computer, laptop, tablet, or other type of user operated computing system that a user, such as a customer of services provided by host computing systems 421 and 431, may use to access services provided by host computing systems 421 and 431.

Host computing system 421 executes hypervisor 423 to allocate physical computing resources 422 among virtual machines 401-403. Likewise, host computing system 431 executes hypervisor 433 to allocate physical computing resources 432 among virtual machines 404-406. Physical computing resources 422 and 432 include processing resources (e.g., processing circuitry, such as Central Processing Unit(s) (CPUs) and/or Graphics Processing Unit(s) (GPUs), Application Specific Integrated Circuits (ASICs) etc.), memory resources including one or more computer readable storage media (e.g., random access memory, read only memory, hard disk drive(s), flash memory, etc. while in no examples would a storage medium of the memory resources be a propagated signal), network interface circuitry, user interfaces, or any other type of computing resource that a physical computing system may include.

Each of virtual machines 401-406 includes a respective guest operating system (OS) 411-416 executing thereon. Each of virtual machines 401-406 further provide respective virtualized network interface cards (VNICs) 441-446 that exchange communications on behalf of their respective guest OSs 411-416. Hypervisor 423 includes router instance 451 and hypervisor 433 includes router instance 452. Router instances 451 and 452 execute to create a logical overlay network between VNICs 441-446 and gateway 461, as discussed below with respect to logical network 500.

Gateway 461 includes communication circuitry for exchanging communications with external network 462 and network switch 460. Gateway 461 also includes processing circuitry that enables gateway 461 to perform as described below. In some examples, gateway 461 may include one or more computer readable storage media that stores program instructions that the processing circuitry reads and executes to perform as described below. The storage media may include random access memory, read only memory, hard disk drive(s), flash memory, and/or some other type of memory device. In no examples would a computer readable storage medium be a propagated signal. In some examples, gateway 461 may be virtualized, such as within one of virtual machines 401-406.

It should be understood that the distribution virtual machines 401-406 evenly across two host computing systems, as shown in FIG. 4, is merely exemplary. Virtual machines 401-406 shown are representative of any number of virtual machines that may be implemented on any number of host computing systems.

Host computing system(s) 441 have similar structure to that of host computing systems 421, 431. As such, host computing system(s) 441 may similarly host one or more virtual machines via respective hypervisors. For example, as additional virtual machines are needed based on demand for a service provided by the virtual machines, then the additional virtual machines may be instantiated on one or more of host computing system(s) 441.

Figure 5:
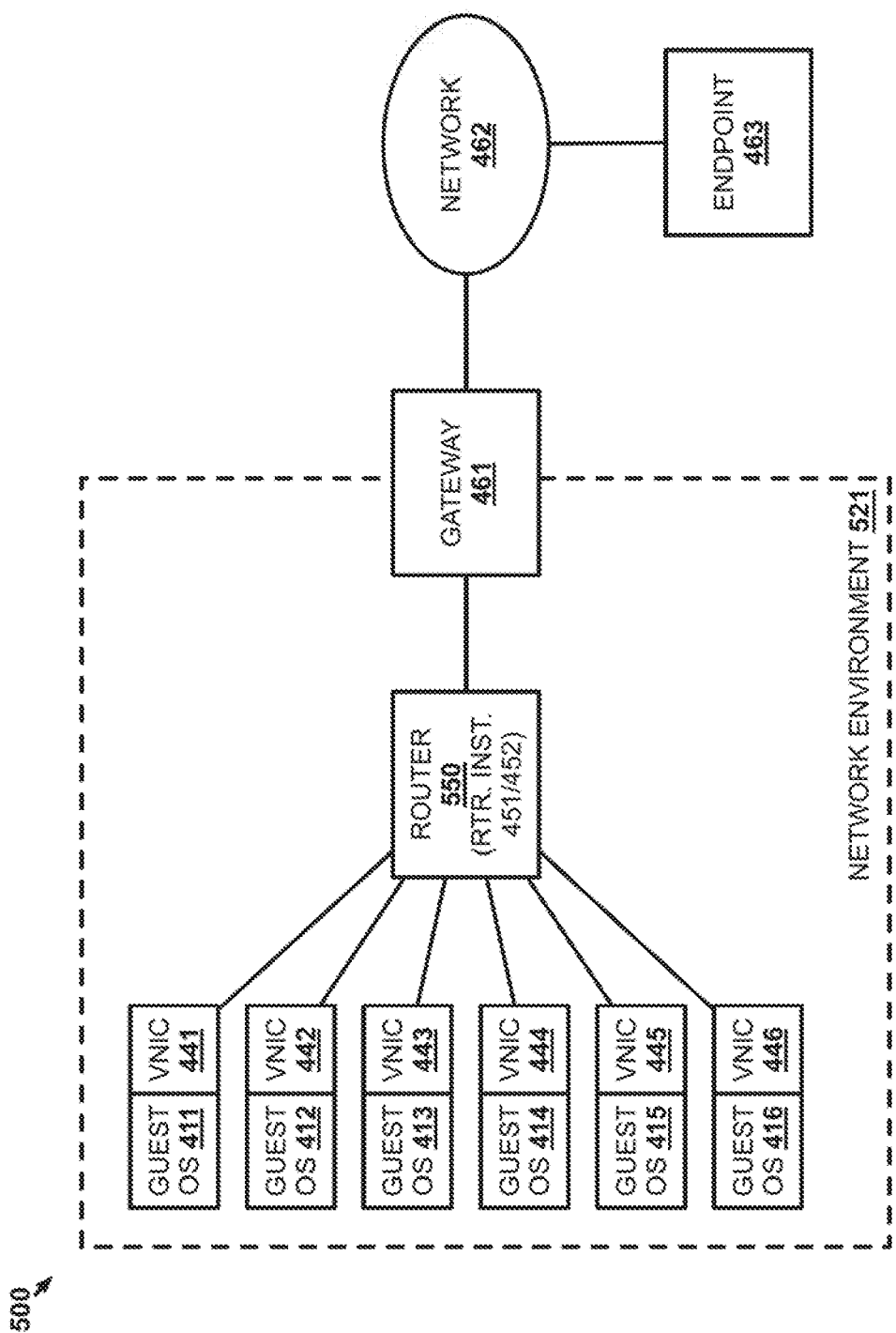
FIG. 5 illustrates a logical network for handling network traffic based on user information in packet headers.

FIG. 5 illustrates logical network 500 for handling network traffic based on user information in packet headers. Logical network 500 includes network environment 521 for which gateway 461 facilitates the ingress and egress of communications. Network environment 521 comprises a logical overlay network generated by router 550. Router 550 effectively acts as a single routing element even though router instances 451 and 452 execute on different hypervisors 423 and 433 to implement router 550. Packets exchanged between VNICs 441-446 and between VNICs 441-446 and gateway 461 are routed through router 550.

In this example, VNICs 441-446 are tasked with enforcing routing policies of network environment 521 that enables microsegmentation of guest OSs 411-416 within network environment 521. Microsegmentation allows the logical overlay network within network environment 521 to be subdivided into smaller segments depending on various predefined criteria of network traffic. For example, microsegmentation policies in network environment 521 may prevent guest OS 411 from communicating with guest OS 415. In that case, if VNIC 445 recognized received packets as having been transferred from VNIC 441 (e.g., by recognizing the source address in the packets' header), then VNIC 445 may drop the packets rather than passing the data therein to guest OS 415. Network environment 521, as discussed further below, enables the microsegmentation, or other policies, therein to be based on user information appended to packet headers by gateway 461.

While VNICs 441-446 enforce network policies based on packet header information in this example, it should be understood that other network components may be used for at least a portion of that enforcement. For instance, one or more firewall components may be placed between gateway 461 and VNICs 441-446. In other examples, other types of policies, such as quality of service policies, may be enforced based on the user information supplied by gateway 461. Other types of network components within network environment 521 may also be configured to read the user information added to packets by gateway 461, as discussed below, and handle those packets in some manner based on the user information.

Figure 6:
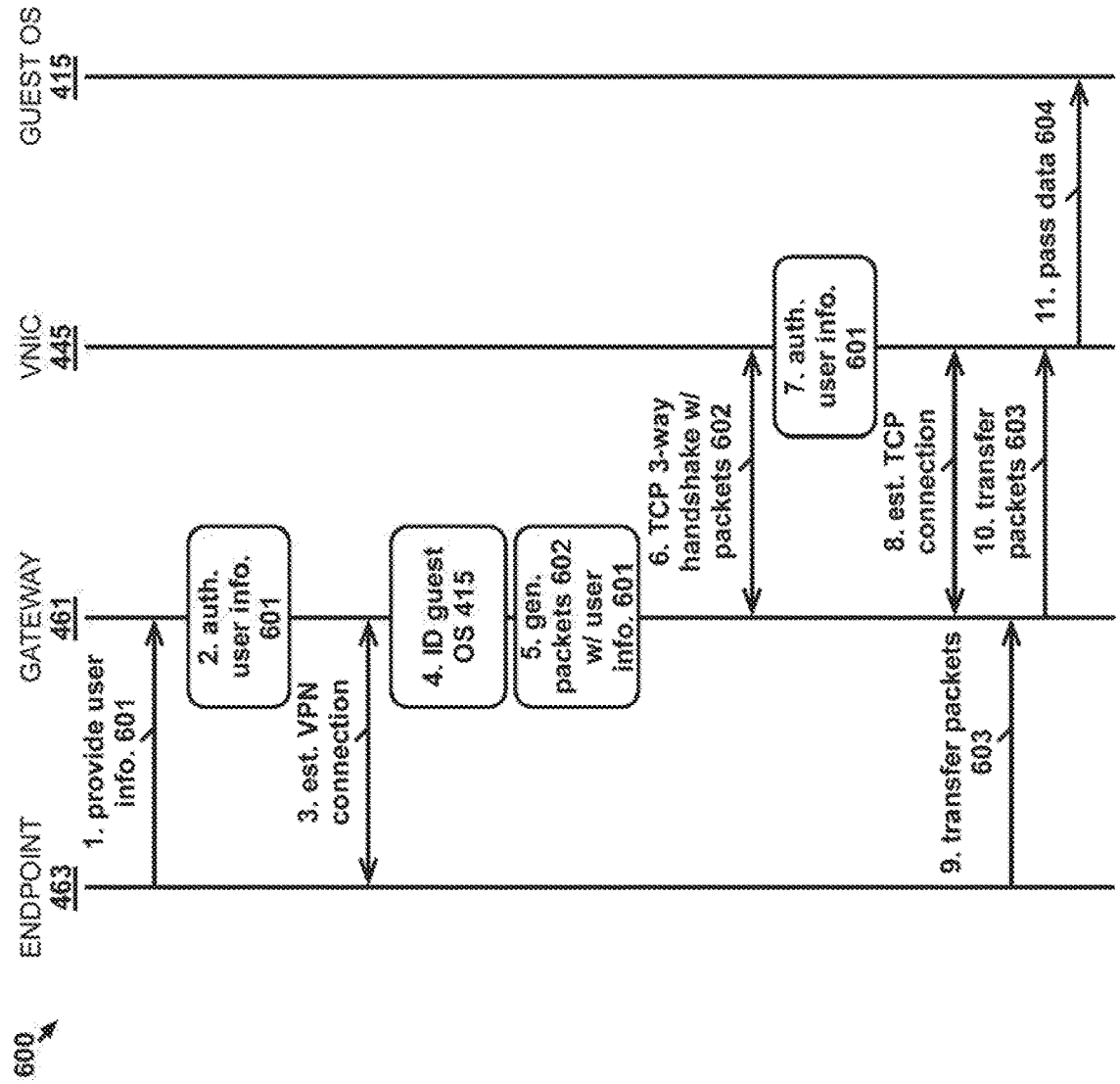
FIG. 6 illustrates an operational scenario for handling network traffic based on user information in packet headers.

FIG. 6 illustrates operational scenario 600 for handling network traffic based on user information in packet headers. In operation, endpoint 463 is instructed by its user to initiate a communication with gateway 461 to access a service provided by network environment 521. For example, network environment 521 may provide virtual desktop services to endpoints that connect to network environment 521 through gateway 461. Specifically, each of guest OSs 411-416 may comprise operating systems that provide their desktop user interfaces from network environment 521 over external network 462. Those user interfaces are operated via endpoints, such as endpoint 463 over external network 462 (e.g., the virtual desktop from network environment 521 may be displayed and manipulated through a display window of an endpoint's user interface).

In response to the user instruction, endpoint 463 contacts gateway 461 and provides user information 601 at step 1 to gateway 461. User information 601 at least identifies the user of endpoint 463 to gateway 461. Gateway 461 determines whether the user of endpoint 463 is authorized to access network environment 521 at step 2. Gateway 461 may access information (e.g., a list of service subscribers) stored in gateway 461, or in some other repository, to determine whether the user identified by user information 601 is authorized to access network environment 521. In some cases, gateway 461 may perform the authorization process based solely on the user identity provided in user information 601. However, in other (likely most) cases, endpoint 463 may further provide user credentials (e.g., password, security token, etc.) to gateway 461 that gateway 461 uses to authenticate that the user of endpoint 463 is who they are purporting to be. In some examples, those credentials may be considered as included in user information 601, although, once the user has been authenticated, only the user's identity may be relevant within network environment 521 (i.e., the user may not need to be authenticated again once allowed through gateway 461 into network environment 521). Once gateway 461 determines that the user of endpoint 463 is authorized to access network environment 521, gateway 461 establishes a secure VPN connection at step 3 with endpoint 463. If, in other examples, gateway 461 did not authorize the user of endpoint 463, then the VPN connection would not be created and endpoint 463 would not be allowed to communicate with network environment 521 through gateway 461.

After the VPN connection between gateway 461 and endpoint 463 has been established, gateway 461 determines at step 4 that endpoint 463 should be provided service by guest OS 415. Gateway 461 may select guest OS 415 randomly, based on selection criteria, by querying another system, or using some other manner of selection—including combinations thereof. For example, gateway 461 may query an OS selection system (not shown) about which guest OS should service endpoint 463.

Regardless of how guest OS 415 is selected, after selection, gateway 461 establishes a TCP connection with VNIC 445, which is the VNIC for guest OS 415, over which IP packets can be exchanged between VNIC 445 and gateway 461. To establish the TCP connection, gateway 461 generates one or more IP packets 602 at step 5 that will be used to initiate a three-way handshake with VNIC 445 in accordance with TCP. When generating IP packets 602, gateway 461 adds user information 601 to the respective packet headers of IP packets 602. User information 601 may be added unmodified from what was received from endpoint 463 or gateway 461 may modify user information 601 for the purposes of adding user information 601 to the packet headers and/or to comply with the type of information relevant within network environment 521. For example, while a username in user information 601 from endpoint 463 may have identified the user of endpoint 463 to gateway 461, that username may not be relevant within network environment 521. Instead, element reading IP packet headers in network environment 521 may expect a real-world name of the user. Gateway 461 may, therefore, include the real-world name of the user in user information 601 in place of, or in addition to, the username received from endpoint 463. Similarly, in some cases, the identity of the specific user may not be necessary, but the type of user is (e.g., the user's purchased service level) and user information 601 may be modified by gateway 461 to indicate the type of user. In some examples, gateway 461 may need to reduce the size of user information 601 to enable user information 601 to fit in a limited amount of space allowed by an IP packet header. In further examples, gateway 461 may add additional information to user information 601 that may be relevant within network environment 521. For instance, gateway 461 may be able to determine the geographic location of endpoint 463 based on the IP address of endpoint 463 used for the VPN connection. Since the VPN connection is terminated at gateway 461, components within network environment 521 would be unaware of that IP address to determine the geographic location of endpoint 463 on their own. Gateway 461 may, therefore, include an indicator of the geographic location within user information 601 that is added to the headers of IP packets 602.

After generating IP packets 602, gateway 461 transfers IP packets 602 to VNIC 445 to initiate the three-way handshake at step 6 with VNIC 445. Upon receiving IP packets 602, VNIC 445 reads user information 601 and determines, based on user information 601 at step 7, whether a TCP connection with VNIC 445 should be authorized. In this example, the TCP connection is authorized and then established between gateway 461 and VNIC 445 at step 8. In other examples, VNIC 445 may determine that the TCP connection is not authorized and operational scenario 600 would not proceed to step 8 in that case. To determine whether to authorize the TCP connection, a management plane for virtual machines 401-406 may provide VNIC 445 may with a set of rules or policies that should be applied to user information found in received packets. For example, the policies may indicate which types of users (e.g., users of a given service level) should be allowed to connect and from what geographic locations those users are allowed to connection from. VNIC 445 may therefore obtain the type of user and the geographic location of endpoint 463 from reading user information 601 from the headers of IP packets 602. In this example, the user of endpoint 463 and endpoint 463's geographic location indicate that endpoint 463 should be allowed to connect to VNIC 445 through gateway 461 based on the policies used by VNIC 445.

Once the TCP connection is established between gateway 461 and VNIC 445, there are now two distinct connections on the communication bath between endpoint 463 and VNIC 445. The VPN connection between endpoint 463 and gateway 461 and the TCP connection between gateway 461 and VNIC 445 within network environment 521. IP packets 603 are transferred from endpoint 463 to gateway 461 at step 9 over the VPN connection. IP packets 603 include data 604, which comprises data directed to guest OS 415 for the purposes of guest OS 415 providing a service to endpoint 463 (e.g., the virtual desktop from the example above). IP packets 603 are then transferred from gateway 461 to VNIC 445 at step 10 over the TCP connection. Upon receipt of IP packets 603, VNIC 445 passes data 604 carried by IP packets 603 at step 11 into guest OS 415.

In some examples, gateway 461 may include user information 601 in the headers of IP packets 603. The inclusion of user information 601 in the headers of IP packets 603 may be in addition to or instead of including user information 601 in IP packets 602, as discussed above. If user information 601 is included in IP packets 603 rather than in IP packets 602, the TCP connection may be established regardless of user information 601 and VNIC 445 determines whether subsequent packets (e.g., IP packets 603) transferred over the TCP connection should be allowed to pass into guest OS 415 by applying policies/rule to user information 601 therein. Even if user information 601 is already included in IP packets 602, user information 601 may change over time. For example, endpoint 463 may be a mobile device that can move between geographic locations. Gateway 461 may change the geographic location indicated in user information 601 as endpoint 463 moves. Upon reading user information 601 with the new geographic location from one or more of IP packets 603, VNIC 445 may determine that data 604 should no longer be passed to guest OS 415 due to the new geographic location running afoul of a policy. In that example, VNIC 445 may also stop all outgoing traffic from guest OS 415 directed to endpoint 463 and/or may disconnect the TCP connection between gateway 461 and VNIC 445.

In some examples, VNIC 445 may add user information 601 received in IP packets 603 to outgoing packets associated with endpoint 463. For example, guest OS 415 may communicate with guest OS 412 while providing service to endpoint 463. Packets setting up a TCP connection and/or carrying data being transferred from guest OS 415 to guest OS 412 will have user information 601 included in their headers by VNIC 445. VNIC 442 can then read user information 601 to determine whether the packets received from VNIC 445 in association with a service being provided to endpoint 463 should be allowed based on network policies/rules, thereby further microsegmenting network environment 521 based on user information 601.

Figure 7:
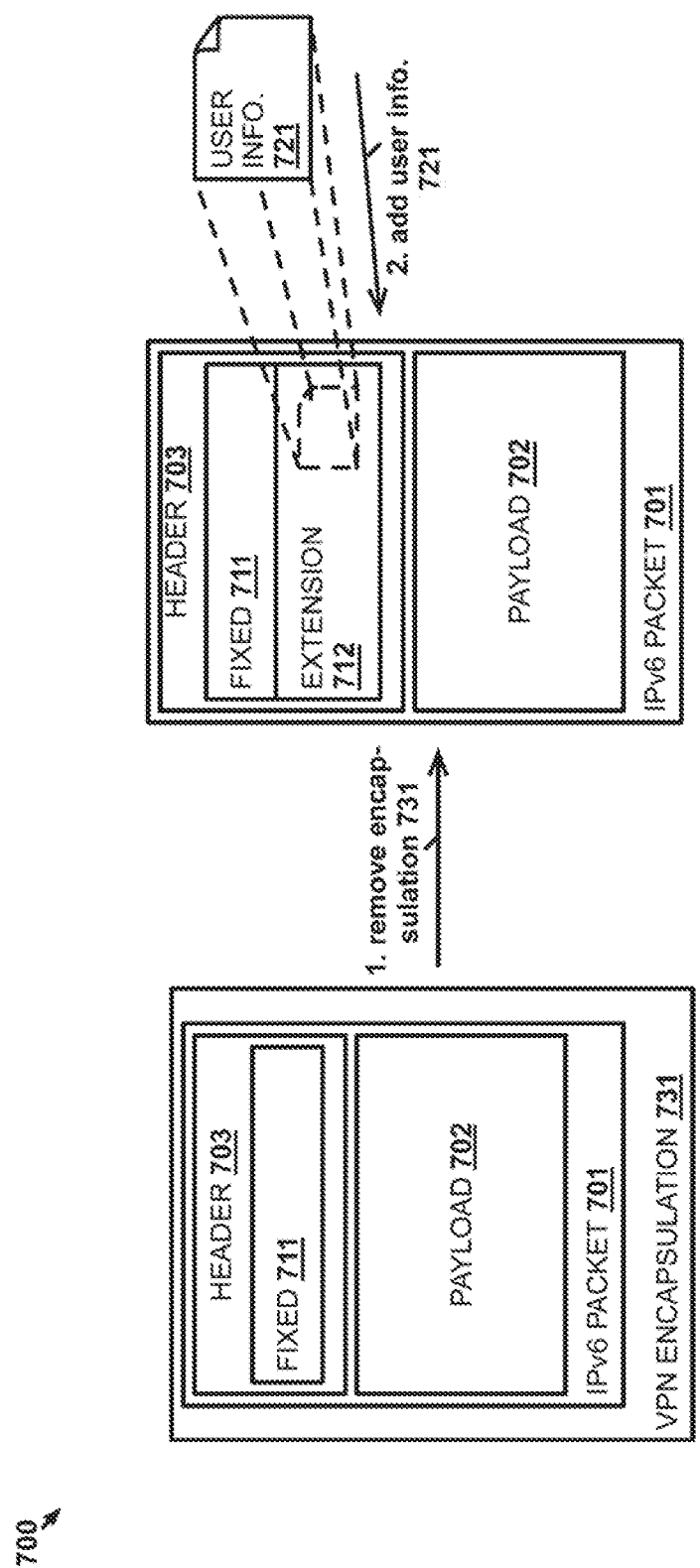
FIG. 7 illustrates another operational scenario for handling network traffic based on user information in packet headers.

FIG. 7 illustrates operational scenario 700 for handling network traffic based on user information in packet headers. Operational scenario 700 is an example of how communications received by gateway 461 from endpoint 463 over the VPN connection is handled by gateway 461. In this example, packets transferred to VNIC 445 by gateway 461 over the TCP connection (e.g., IP packets 603) use IPv6. IPv6 packet 701 is an example of one of those IP packets.

In this example, IPv6 packet 701 is encapsulated at endpoint 463 into VPN encapsulation 731 for transfer over the VPN connection between endpoint 463 and gateway 461. VPN encapsulation 731 comprises at least another packet header on top of header 703 for IPv6 packet 701 but, in most cases, VPN encapsulation 731 also encrypts IPv6 packet 701 to protect against unwanted access to IPv6 packet 701. Upon receiving IPv6 packet 701 in VPN encapsulation 731, gateway 461 removes VPN encapsulation 731 at step 1 from IPv6 packet 701 (e.g., removes the VPN header and decrypts the VPN's encryption of IPv6 packet 701).

Once VPN encapsulation 731 is removed, gateway 461 adds user information 721 at step 2 to header 703. User information 721 is an example of user information 601 from operational scenario 600. In particular, header 703 has fixed header 711 in accordance with IPv6. Fixed header 711, like all fixed headers in IPv6, is 40-bytes in length and includes 8 predefined fields. A "next header" field within those 8 predefined fields indicates whether an extension header exists and, if so, what type of extension header exists. In examples, where no extension header exists, the next header field points to an upper layer (UL) header (e.g., a header for TCP, Internet Control Message Protocol, User Datagram Protocol, etc.) that every IPv6 packet includes but is not shown in this example). In this example, extension header 712 did not exist when IPv6 packet 701 was received by gateway 461 in VPN encapsulation 731. Thus, upon receipt of IPv6 packet 701, the next header field of IPv6 packet 701 indicated the UL header.

To add user information 721 to header 703, gateway 461 adds extension header 712 to header 703. Consequently, gateway 461 also edits the next header field of fixed header 711 to indicate the existence of extension header 712. When indicating the existence of extension header 712, the next header field indicates the type of extension header being used. In this case, one or both of types 253 and 254, which are reserved for experimentation and testing, may be used for user information 721 and indicated in the next header field of fixed header 711. Once user information 721 has been added to extension header 712, as described above, IPv6 packet 701 is passed by gateway 461 into network environment 521. Components within network environment 521, such as VNICs 441-446, can read user information 721 from extension header 712 and treat IPv6 packet 701 in accordance with rules/policies applied to user information 721. User information 721 does not need to be obtained in other manners, such as though inspecting payload 702 of IPv6 packet 701, if any of those other manners are even possible.

In this example, IPv6 packet 701 and its payload 702 remain constant from VPN encapsulation 731 through having extension header 712 with user information 721 added thereto. In other examples, gateway 461 may extract payload 702 and create one or more new packets with extension headers having user information 721. For instance, payload 702 may be divided among multiple new packets or may be combined with payloads from other VPN encapsulated packets into one or more new packets. In some examples, header 703 may already include one or more extension headers of one or more types to which gateway 461 will add extension header 712 of types 253 and/or 254 in order to include user information 721. In those examples, the next header field of fixed header 711 will indicate a first extension header in an order defined by IPv6 and that first extenuation header will have another next header field that directs to a subsequent extension header in the order (not all extension header types need be present but the order of one type coming before another is still maintained). This linked list type format continues until extension header 712 is reached (last in the defined order) and the next header field indicates the UL header, which is also the case when extension header 712 is the only extension header.

Operational scenario 700 focuses on adding user information 721 to IPv6 packets using the fixed and extension headers provided by IPv6. In another example, IPv4 packets may be used. IPv4 provides 13 predefined fields for packet headers complying with the protocol. While IPv4 headers do not include extension headers like IPv6, IPv4 headers may include an optional 14th field, commonly called the "options" field. The 13 predefined fields of an IPv4 header include an Internet Header Length (IHL) field. The IHL field indicates the size of the IPv4 header in 32-bit word increments. The minimum value for the IHL field is 5, which indicates that the minimum size for an IPv4 header without the options field is 160-bits. The maximum value for the IHL field is 15, which allows for the options field to include up to 320-bits of information. Gateway 461 would modify the IHL field to indicate an options field large enough to include user information 721 without going over 320-bits (assuming no other information is in the options field).

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method of passing information about a user into a network environment from a gateway to the network environment, the method comprising:
   in the gateway:
      receiving first user information from a first connection endpoint outside of the network environment;
      in response to authorizing the user based on the first user information, establishing a first virtual private network (VPN) connection between the gateway and the first connection endpoint;
      removing encapsulation of one or more first packets received from the first connection endpoint over the first VPN connection;
      adding the first user information to a packet header of the one or more first packets; and
      transferring the one or more first packets into the network environment.

2. The method of claim 1, wherein the one or more first packets comply with Internet Protocol version 4 and wherein adding the first user information to the packet header comprises:
   including the first user information to an option type field of the packet header.

3. The method of claim 1, wherein the one or more first packets comply with Internet Protocol version 6 and wherein adding the first user information to the packet header comprises:
   including the first user information to an extension header of the packet header.

4. The method of claim 1, further comprising:
   in the gateway, establishing a second connection within the network environment using a transport protocol.

5. The method of claim 4, wherein the one or more first packets comprise handshake packets exchanged during a handshake procedure for the transport protocol.

6. The method of claim 1, wherein the one or more first packets comprise packets received via the first VPN connection.

7. The method of claim 1, further comprising:
   implementing microsegmentation within the network environment based on the first user information in the packet header.

8. The method of claim 7, wherein implementing the microsegmentation comprises:
   enforcing policies at one or more packet network interfaces within the network environment.

9. An apparatus for passing information about a user into a network environment from a gateway to the network environment, the apparatus comprising:
   one or more computer readable storage media;
   a processing system operatively coupled with the one or more computer readable storage media; and
   program instructions stored on the one or more computer readable storage media for a network traffic optimizer that, when read and executed by the processing system, direct the processing system to:
      receive first user information from a first connection endpoint outside of the network environment;
      in response to authorizing the user based on the first user information, establish a first virtual private network (VPN) connection between the gateway and the first connection endpoint;
      removing encapsulation of one or more first packets received from the first connection endpoint over the first VPN connection;
      add the first user information to a packet header of the one or more first packets; and transfer the one or more first packets into the network environment.

10. The apparatus of claim 9, wherein the one or more first packets comply with Internet Protocol version 4 and wherein to add the first user information to the packet header, the program instructions direct the processing system to:
include the first user information to an option type field of the packet header.

11. The apparatus of claim 9, wherein the one or more first packets comply with Internet Protocol version 6 and wherein to add the first user information to the packet header, the program instructions direct the processing system to:
include the first user information to an extension header of the packet header.

12. The apparatus of claim 9, wherein the program instructions further direct the processing system to:
establish a second connection within the network environment using a transport protocol.

13. The apparatus of claim 12, wherein the one or more first packets comprise handshake packets exchanged during a handshake procedure for the transport protocol.

14. The apparatus of claim 9, wherein the one or more first packets comprise packets received via the first VPN connection.

15. The apparatus of claim 9, wherein the program instructions further direct the processing system to:
implement microsegmentation within the network environment based on the first user information in the packet header, wherein the microsegmentation includes enforcing policies at one or more packet network interfaces within the network environment.

16. One or more computer readable storage media having program instructions stored thereon for passing information about a user into a network environment from a gateway to the network environment, the program instructions, when read and executed by a processing system, direct the processing system to:
receive first user information from a first connection endpoint outside of the network environment;
in response to authorizing the user based on the first user information, establish a first virtual private network (VPN) connection between the gateway and the first connection endpoint;
removing encapsulation of one or more first packets received from the first connection endpoint over the first VPN connection;
add the first user information to a packet header of the one or more first packets; and
transfer the one or more first packets into the network environment.

* * * * *